W. M. LYMAN.
ANIMAL BLANKET.
APPLICATION FILED JAN. 3, 1911.
1,028,581.
Patented June 4, 1912.
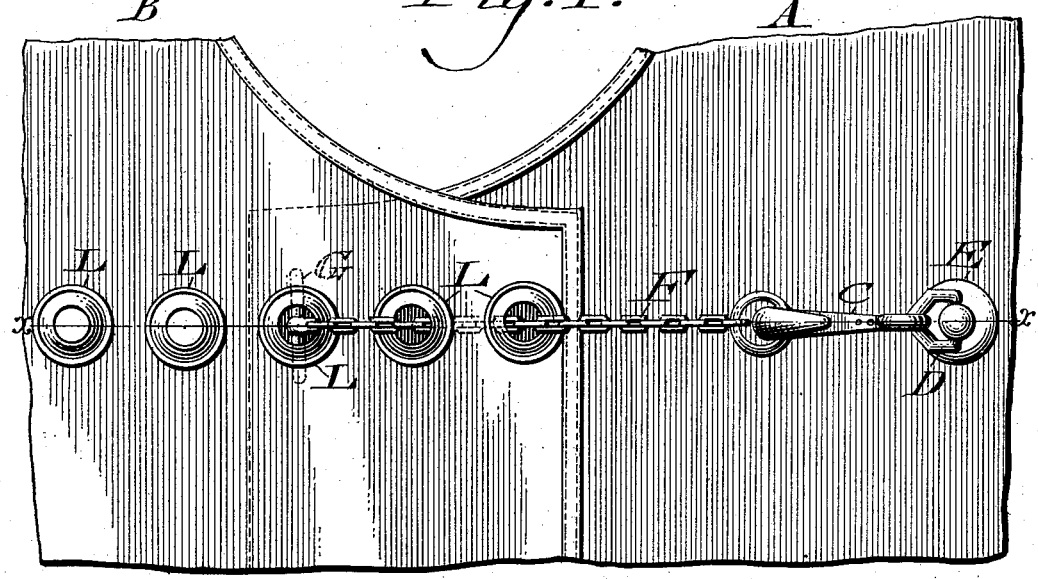
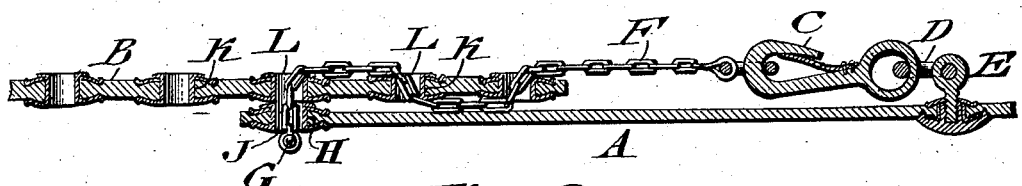
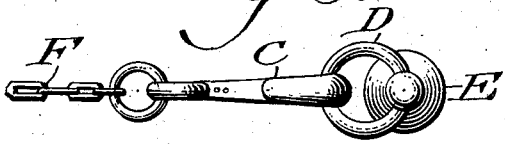
WITNESSES
INVENTOR
ATTORNEYS

UNITED STATES PATENT OFFICE.

WALTER M. LYMAN, OF PHILADELPHIA, PENNSYLVANIA.

ANIMAL-BLANKET.

1,028,581.  Specification of Letters Patent.  Patented June 4, 1912.

Application filed January 3, 1911. Serial No. 600,475.

*To all whom it may concern:*

Be it known that I, WALTER M. LYMAN, a citizen of the United States, residing in the city and county of Philadelphia, State of Pennsylvania, have invented a new and useful Animal-Blanket, of which the following is a specification.

My invention relates to a blanket for a horse or other animal and consists of a fastening for the open overlapping or flap members thereof, whereby said members may be effectively closed and secured, they are so sustained that they are prevented from dropping or sagging and after adjustment on the animal, they will preserve their normal appearance when in use, the fastening embodying a chain or a length of flexible material which is connectible detachably with one of said members, may be reeved through openings in the other member and held in place on the first named member by a device on the free end of said chain or length of flexible material, so that the members are doubly supported, and they may be readily disconnected and when disconnected, the chain remains in the member in which it is reeved without having its adjustment disturbed ready to be re-applied to the same animal without shifting the chain, all as will be hereinafter described, the novel features being pointed out in the claim.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a front view of a portion of a horse blanket embodying my invention. Fig. 2 represents a horizontal longitudinal section thereof on line *x—x* Fig. 1. Fig. 3 represents a face view of different form of parts of the fastening that may be employed.

Similar letters of reference indicate corresponding parts in the figures.

Referring to the drawings:—A and B designate front members of a horse blanket the same being adapted to be placed on the animal and close as usual, the two members overlapping as flaps. In order to fasten said members, I employ the snap hook C which is connected with the member A by the ring D and clamp E, the chain F, and the cross bar or head G, the latter being on the terminal of the chain F opposite to the hook C, it being noticed that the member A has therein an opening H, which is metal-lined forming the eyelet or gromet J, and that the member B has therein a series of openings K which are metal lined forming the eyelets or gromets L. The opening H is adapted to be placed coincidentally with either one of the series of openings K relatively to the adjustment of the front members or portions of the blanket. The chain F is reeved through the required gromets L of the member B relatively to the requirements of adjustment of the members A B on the animal, the cross head G being finally passed through the gromet J of the member A, which registers with the gromet L of the member B and turned at a right angle to the opening of said gromet and controlled on the wall thereof against return motion, when the members A B are closed, firmly connected and doubly supported, whereby they are prevented from opening, dropping or sagging. When the blanket is to be removed, the cross head G is properly turned on the chain and manipulated, whereby it may be passed backwardly through the gromet J, when the members A and B are disconnected, and it may be passed with the chain through the other gromets, and so removed from the member B, and the chain when required may be disengaged from the snap hook. When the flaps are separated and the blanket accordingly is opened, the chain remains a fixture in the gromets of the outer flap and will not improperly slide out therefrom owing to the fact that the cross bar is longer than the diameter of the inner gromet of said flap and the ring which connects the snap hook with the opposite end of the chain is of a diameter greater than the end gromet of said flap, said ring and cross bar thus constituting stops on the ends of the chain for the above purpose as is evident.

In Fig. 3 the snap hook C is shown as removable from the ring D, while remaining connected with the chain without, however, producing different results in the operation of fastening and unfastening the members.

As another manner of disconnecting the members in order to open the blanket and permit its removal, the cross head may be withdrawn from its gromet in the member A and the chain remains connected with the gromet of the member B. The chain may then be disconnected from the hook C in Fig. 2 or the hook may be disconnected from the ring in Fig. 3, but in either case, the members are no longer controlled by the fastening, and the chain may remain in its reevings in the gromets of the member B, without having disturbed its adjustment, whereby when the blanket is placed again on the animal, the chain may have its ends connected respectively with the hook C or ring D on the member A, and the gromet J of said member, the previous adjustment of the members A B relatively to each other being preserved.

Having thus described my invention what I claim as new and desire to secure by Letters Patent, is:—

A blanket having overlapping flaps and an opening in the inner flap at the end thereof, a hook attached to said flap and set back from said end, and a series of alined openings in the outer flap, in combination with a flexible member having both ends disconnected from said outer flap and which is adapted to be reeved in a number of said alined openings and remain in the flap in which it is reeved when the flaps are separated, and a cross head on one end of said member adapted to be passed loosely through the end opening of the inner flap and interlocked with the latter in said opening and having on the other end a ring providing for detachable connection with said hook the length of said cross bar and the diameter of said ring being greater than the diameters of said openings, said cross bar and said ring thus serving as stops on the terminals of the flexible member preventing change in the adjustment of the latter, and improper disconnection of the same from the openings in the flap that it occupies.

WALTER M. LYMAN.

Witnesses:
    JOHN A. WIEDERSHEIM,
    WM. CANER WIEDERSEIM.

---

Copies of this patent may be obtained for five cents each, by addressing the "Commissioner of Patents, Washington, D. C."